May 28, 1957

H. J. McCOTTER 2,793,539

BRAKE PEDAL STRUCTURE

Filed Sept. 3, 1953

INVENTOR.
HAROLD J. McCOTTER
BY

ATTORNEY

United States Patent Office 2,793,539
Patented May 28, 1957

2,793,539

BRAKE PEDAL STRUCTURE

Harold J. McCotter, Detroit, Mich., assignor to General Motors Corporation, Detroit, Mich., a corporation of Delaware Application September 3, 1953, Serial No. 378,343

4 Claims. (Cl. 74—484)

This invention relates to brake pedal structures and the mounting of the same within the passenger compartment of a motor vehicle.

With the advent of automatic transmissions in motor vehicles, the left foot of the operator is left without any work to do. This leaves the right foot of the operator to perform all functions of braking and operation of the accelerator so that all foot operations are now carried by the right foot of the operator.

There are numerous occasions when it would be desirable to operate the brake system of the vehicle and still have control of the accelerator of the motor vehicle. This can be accomplished by the operator using the left foot to engage the brake pedal and the right foot to operate the accelerator. However, the present position of the brake pedal completely at the right side of the steering column of the motor vehicle makes it extremely awkward for the operator to move the left foot below the steering column to engage the brake pedal on the right side of the steering column.

It is therefore an object of this invention to provide a brake pedal structure and mounting for the same that symmetrically arranges the foot pad portions of the brake pedal on both sides of the steering column so that the brake pedal is equally available for use by either the left or right foot of the operator. This arrangement permits the operator to use the left foot in certain braking operations, as in traffic, more advantageously and provides relief for the right foot from all of braking operations, as is desirable when braking on long grades.

It is therefore a further object of the invention to provide a suspended brake pedal with a foot pad portion arranged at each side of the steering column, the foot pad portions being connected together rigidly by a pedal portion positioned beneath the steering column so that the foot pad portions can be of relatively large area for ease of engagement by either foot of the operator with equal facility.

It is also another object of the invention to provide a foot pedal and mounting in accordance with the foregoing object wherein the suspension arm for suspending the brake pedal connects with a foot pad portion on one side of the steering column while the foot pad portion on the opposite side of the steering column engages an actuating member connected with a power brake unit, the advent of power braking on motor vehicles providing sufficient ease of operation of the brakes as to make braking of the vehicle by the left foot practical.

Further objects and advantages of the present invention will be apparent from the following description, reference being had to the accompanying drawings wherein a preferred form of the invention is clearly shown.

Figure 1:
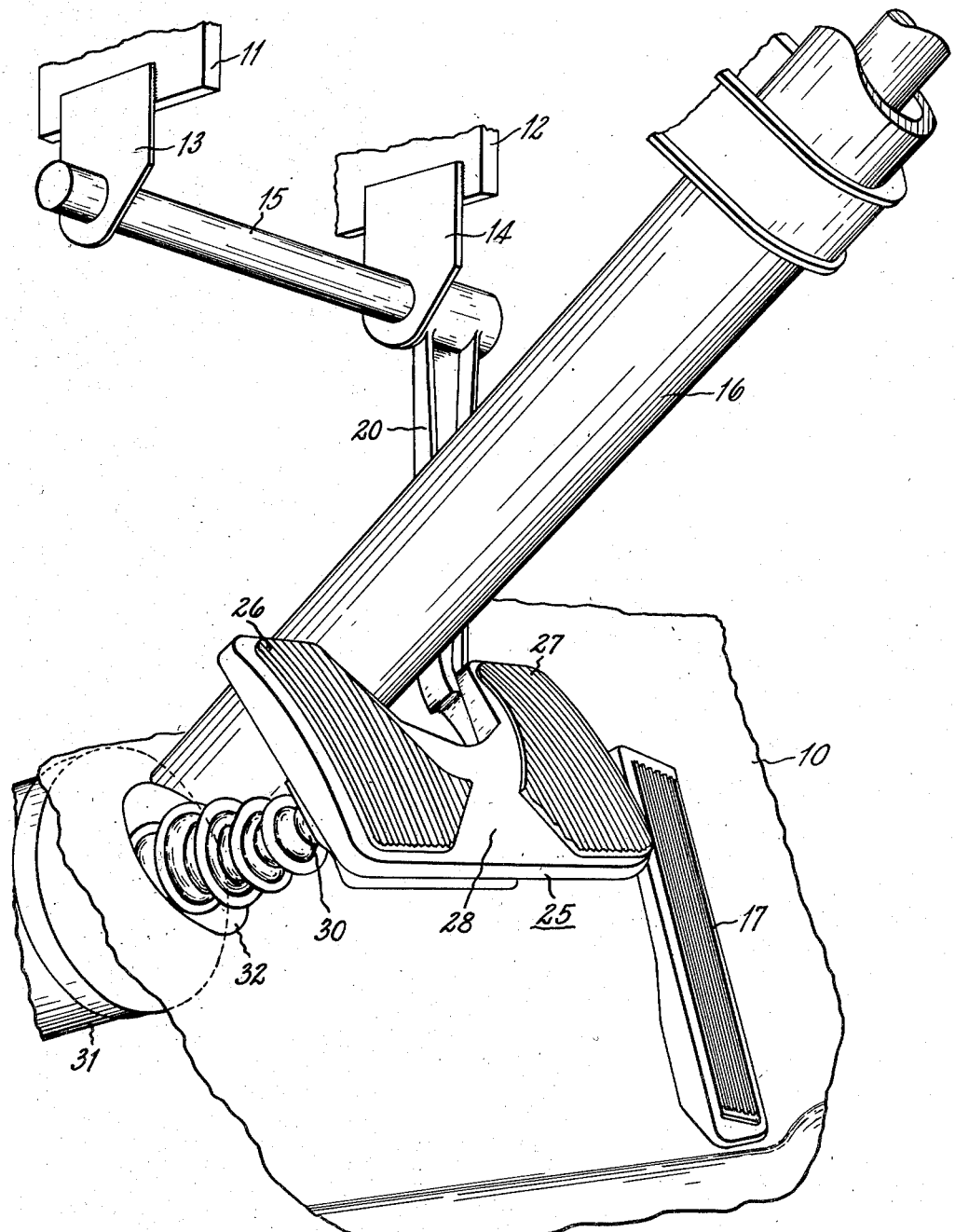
Figure 1 is a perspective elevational view of portions of a motor vehicle illustrating the pedal structure and mounting thereof of this invention.
Figure 2:
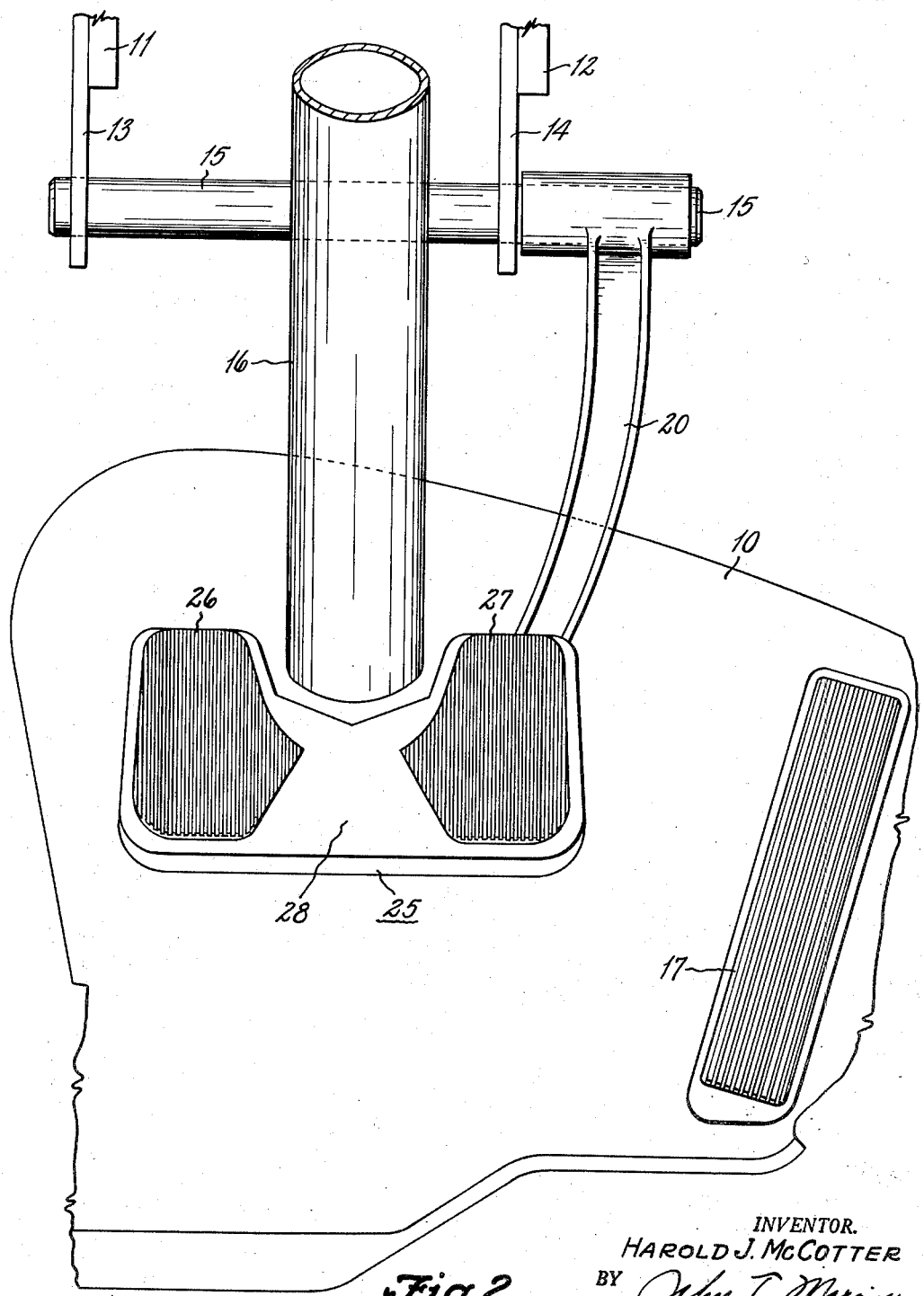
Figure 2 is a front elevational view of the pedal structure illustrating its mounting on a motor vehicle.

In this invention the pedal structure is of the suspended type and is adapted for mounting in a motor vehicle of conventional construction. The motor vehicle includes the usual toe board 10 that separates the engine compartment from the passenger compartment and through which the several controls for the vehicle operate other controls for the engine and the brakes of the vehicle. The toe board 10 is connected into the body structure in conventional manner. The body structure includes a conventional body wall structure positioned above the toe board that includes the fire wall between the passenger compartment and the engine compartment and the conventional dash from which brackets or other support members extend for supporting structures within the passenger compartment. The body wall structure is provided with support bracket 11 and 12 that may be secured to the fire wall of the body or to the dash. The support brackets 11 and 12 have extensions 13 and 14 that support a pivot rod 15, the rod 15 providing means establishing a pivot connection above the steering column 16 from which a brake pedal suspension arm depends. The steering column 16 rises from the toe board 10 angularly into the passenger compartment in conventional manner. An accelerator pedal 17 is mounted on the toe board 10 for the usual connection with the engine controls.

A brake pedal suspension arm 20 is carried on the pivot shaft 15, the arm 20 extending downwardly along one side of the steering column 16. At the lower end of the suspension arm 20 there is mounted a brake pedal 25.

The brake pedal 25 comprises the substantially parallel extending foot pad portions 26 and 27 that are placed at opposite sides of the steering column 16. The foot pad portions 26 and 27 are connected together rigidly by a substantially horizontally extending pedal portion 28 that is positioned below the steering column 16.

The substantially vertical extending parallel portions 26 and 27 provide a greater pedal area for engagement by the left or right foot of an operator than could normally be obtained by placing all of the foot pad portion below the steering column 16 as the clearance between the steering column and the floor of the vehicle restricts the amount of brake pedal that can be used in the area available, and further the lower end of the pedal becomes so low to the floor that it is arranged in an impractical position for engagement by the foot of the operator.

Thus, by placing the foot pad portions 26 and 27 at each side of the steering column 16, the foot engaging areas of the pedal are placed in practical and convenient position for engagement by either the left or right foot of the operator and still provides for sufficient pedal area as to give a satisfactory foot engagement area for operation of the brakes.

The brake pedal 25 is supported from the suspension arm 20 by one of the foot pad portions 27 being connected with the arm 20.

The opposite foot pad portion 26 connects with the actuating member 30 of a power brake unit 31 of conventional structure that is mounted below the toe board 10, the actuating member 30 of the power brake unit 31 projecting through the opening 32 in the toe board for connection with the foot pad portion 26 of the pedal 25.

From the foregoing description it will be apparent that the brake pedal 25 is equally available to the left or right foot of the operator for operation with equal facility and with equivalent foot pad areas being provided for engagement by either the left or right foot of the operator.

While the form of embodiment of the invention as herein disclosed constitutes a preferred form, it is to be understood that other forms might be adopted as may come within the scope of the claims which follow.

What is claimed is as follows:

1. In combination in a motor vehicle, a toe board separating the passenger compartment from the engine compartment of the vehicle, a steering column rising angularly from the toe board into the passenger compartment, means providing a pivot connection above the steering column for a brake pedal suspension arm, a suspension arm pivotally supported from the said pivot connection and extending downwardly relative thereto at one side of said column, and a brake pedal on the lower end of said suspension arm and below said column, said brake pedal having foot pad portions positioned at each side of said column with a generally horizontally extending portion below the column rigidly connecting the foot pad portions whereby said pedal partially encloses the column, said foot pad portions being substantially identical in size providing symmetry of brake pedal surface at each side of said column to make the pedal equally available for use by the left or right foot of the operator at the left or right sides respectively of the steering column.

2. In combination in a motor vehicle, a toe board separating the passenger compartment from the engine compartment of the vehicle, a steering column rising angularly from the toe board into the passenger compartment, means providing a pivot connection above the steering column for a brake pedal suspension arm, a suspension arm pivotally supported from the said pivot connection and extending downwardly relative thereto at one side of said column, and a brake pedal on the lower end of said suspension arm and below said column, said brake pedal having foot pad portions positioned at each side of said column one of which is connected to said suspension arm for support of the brake pedal thereon with a generally horizontally extending portion below the column rigidly connecting the foot pad portions whereby said pedal partially encloses the column, said foot pad portions being substantially identical in size providing symmetry of brake pedal surface at each side of said column to make the pedal equally available for use by the left or right foot of the operator at the left or right sides respectively of the steering column.

3. In combination in a motor vehicle, a toe board separating the passenger compartment from the engine compartment of the vehicle, a steering column rising angularly from the toe board into the passenger compartment, means providing a pivot connection above the steering column for a brake pedal suspension arm, a suspension arm pivotally supported from the said pivot connection and extending downwardly relative thereto at one side of said column, a brake pedal on the lower end of said suspension arm and below said column, said brake pedal having foot pad portions positioned at each side of said column one of which is connected to said suspension arm for support of the brake pedal thereon with a generally horizontally extending portion below the column rigidly connecting the foot pad portions whereby said pedal partially encloses the column, said foot pad portions being substantially identical in size providing symmetry of brake pedal surface at each side of said column to make the pedal equally available for use by the left or right foot of the operator at the left or right sides respectively of the steering column, and a brake booster unit carried on the toe board end having an actuating member therefore engaged by the other of the foot pad portions for operation of the brake booster thereby.

4. In combination in a motor vehicle, a toe board separating the passenger compartment from the engine compartment, a steering column rising angularly from the toe board into the passenger compartment, a passenger compartment body wall structure positioned above the steering column, support means on the said body wall structure disposed above the steering column providing a pivot connection above the steering column for a brake pedal suspension arm, a suspension arm pivotally supported from the said pivot connection and extending downwardly therefrom at one side of said column, and a brake pedal carried on the lower end of said suspension arm having a foot pad portion positioned at each side of said column with the foot pad portions of substantially the same size to provide symmetry of brake pedal surface on each side of said column whereby to make the brake pedal equally available for use with the same facility by the left or right foot of the operator on either the left or right sides of the steering column.

References Cited in the file of this patent

UNITED STATES PATENTS

| | | |
|---|---|---|
| 119,724 | Smith | Oct. 10, 1871 |
| 2,383,690 | Sklovsky et al. | Aug. 28, 1945 |
| 2,467,557 | Jandus | Apr. 19, 1949 |
| 2,599,656 | Ostrow | June 10, 1952 |

OTHER REFERENCES

Publication: Automotive Industries, p. 109, No. 8, vol. 107, Oct. 15, 1952.